(12) United States Patent
Barrenscheen (10) Patent No.: US 10,286,612 B2
(45) Date of Patent: May 14, 2019

(54) METHOD FOR MANUFACTURING A COMPOSITE PART AND COMPOSITE PART

(71) Applicant: COOPER STANDARD GMBH, Lindau/Bodensee (DE)

(72) Inventor: Ulf Barrenscheen, Amtzell (DE)

(73) Assignee: Cooper Standard GmbH, Lindau/Bodensee (DE)

( * ) Notice: Subject to any disclaimer, the term of this patent is extended or adjusted under 35 U.S.C. 154(b) by 17 days.

(21) Appl. No.: 15/535,694

(22) PCT Filed: Jul. 8, 2016

(86) PCT No.: PCT/EP2016/066337
§ 371 (c)(1),
(2) Date: Jun. 13, 2017

(87) PCT Pub. No.: WO2017/009250
PCT Pub. Date: Jan. 19, 2017

(65) Prior Publication Data
US 2017/0348918 A1    Dec. 7, 2017

(30) Foreign Application Priority Data

Jul. 10, 2015    (EP) ..................... 15176351

(51) Int. Cl.
*B29C 69/02*    (2006.01)
*B29C 45/16*    (2006.01)
(Continued)

(52) U.S. Cl.
CPC .......... *B29C 69/02* (2013.01); *B29C 45/1676* (2013.01); *B29C 47/0019* (2013.01);
(Continued)

(58) Field of Classification Search
CPC ....................................................... B29C 69/02
(Continued)

(56) References Cited

U.S. PATENT DOCUMENTS

2003/0228205 A1*  12/2003  Hochholzer ........ B60R 13/0206
411/508

FOREIGN PATENT DOCUMENTS

| DE | 198 03 402 A1 | 8/1998 | |
|---|---|---|---|
| EP | 1 369 304 A1 | 12/2003 | |
| EP | 1369304 A1 * | 12/2003 | ......... B60R 13/0206 |

OTHER PUBLICATIONS

EP1369304-A1 translation, Dec. 2003, Sutter Anton (Year: 2003).*
International Search Report and Written Opinion of the International Searching Authority (9 pages) dated Oct. 17, 2016.

* cited by examiner

*Primary Examiner* — Brent T O'Hern
(74) *Attorney, Agent, or Firm* — Jodi A. Reynolds, Esq.; Harter Secrest & Emery LLP (57) ABSTRACT

A method for manufacturing a composite part (100) for covering, sealing, trimming, or retaining a component of a vehicle, wherein the composite part (100) has a main body (110) with a vehicle side surface (111) and is made of a first polymer, and has a mounting pin (130) configured to engage in a form fitting manner and is made of a second polymer, wherein the second polymer has a higher formability than the first polymer, comprises the steps of extrusion molding of the main body (110) and injection molding of the mounting pin (130). This is done in such a manner that the mounting pin (130) is being integrally bonded to the main body (110) on the side of the vehicle side surface (111).

19 Claims, 6 Drawing Sheets

(51) Int. Cl.
*B60R 13/04* (2006.01)
*B60R 13/02* (2006.01)
*B29C 47/00* (2006.01)
B29L 31/30 (2006.01)
B29L 31/26 (2006.01)
B29C 45/00 (2006.01)
B29C 47/06 (2006.01)
B29K 23/00 (2006.01)
B29K 105/00 (2006.01)

(52) U.S. Cl.
CPC ...... *B29C 47/0033* (2013.01); *B60R 13/0206* (2013.01); *B60R 13/04* (2013.01); B29C 47/062 (2013.01); B29C 2045/0093 (2013.01); B29K 2023/06 (2013.01); B29K 2023/12 (2013.01); B29K 2105/0088 (2013.01); B29K 2995/007 (2013.01); B29L 2031/26 (2013.01); B29L 2031/3005 (2013.01); B29L 2031/3041 (2013.01)

(58) Field of Classification Search
USPC .......................................................... 428/99
See application file for complete search history.

METHOD FOR MANUFACTURING A COMPOSITE PART AND COMPOSITE PART

TECHNICAL FIELD

The invention relates to a method for manufacturing a composite part. The invention further pertains to a composite part obtainable through the method.

The optics and the overall design of modern vehicles is increasingly important, if not decisive, when customers are shopping for a new car. In particular, transitional portions between different components of the vehicle can influence the overall perception. Transitional portions can be among others, the joint area between two separate vehicle parts. Other applications, such as covering wide spread surfaces of, for instance, trunk lids are also envisioned. Ideally such a cover or trimming part should also encompass a sealing function both against acoustic waves and humidity.

BACKGROUND OF THE INVENTION

EP 1 369 304 A1 and US 2003/0228205 A1 disclose a device for fastening molded or extruded plastics parts to an automotive body by positive locking. The fastening device is commonly known as a mounting pin. The mounting pin is made of an elastically deformable material for fastening a molding made of a plastics material by positive locking. The mounting pin is made from the same material as the molding part to be fastened.

DE 198 03 402 A1 discloses an arrangement for mounting a mold component to a chassis body. The arrangement comprises a holding strip having coupling elements. The holding strip further comprises a sealing flange integrally formed with the coupling element. The holding strip comprises prongs for fastening the holding strip to the molding part, thereby fixing the molding part to the chassis body. The holding strip is made from a first polymer and the molding part is made from a second polymer. The holding strip can among others be applied to mount decorative strips, bumper covers, interior lining parts and the like. The holding strip and the molding part are formed separately in order to avoid deformations of the visible surface of the molding part.

U.S. Pat. No. 5,524,955 A discloses a manufacturing process for a rigid cover of a vehicle roof. The rigid cover consists of a glass panel surrounded on all sides by a gap seal fitting onto a roof opening. The gap seal consists of a flat, vertically protruding main profile ridge from whose one side a tongue-shaped protrusion projects downward which interlocks in an undercut groove of a T-shaped aluminum frame. The main profile ridge with its protrusion is here expediently produced from an elastomer with a Shore-A-Hardness of 70. The gap seal further comprises a downward projecting sealing ridge disposed at the main profile ridge. On to the other side of the main profile ridge a hollow chamber profile made of sponge rubber is extruded. The upper and exterior side of this hollow chamber profile features a coating for easier sliding of the roof opening. It should be noted that the ridge for mounting the cover in this case has a higher hardness than the hollow chamber profile for sealing.

EP 1 455 044 A2 discloses a pinch sensor which can be provided in the vicinity of driven closing elements, such as windows, doors, and trunk lids, of vehicles. The pinch sensor can be held by a molding part, for example a rigid cover as discussed in the previous paragraph.

However, the above examples can exhibit problems regarding the use of mounting pins. Usually the mounting pins are formed to the molding part to be mounted to the vehicle. Yet, this can cause a deformation of the visible surface, for example, an indentation or a bulge, which in turn influences the optics of the molding part in a negative way. Furthermore, the known examples are limited with respect to their application, since the choice of materials to form the mounting pin is restricted by the choice of material of the molding part.

It is an object of the invention to provide a multifunctional composite part that allows for a greater variety of applications and can provide an optically appealing surface.

The object is achieved by a method according to claim 1 and a composite part according to claim 12. Advantageous embodiments of the method are subject-matter of dependent claims 2 to 11. An advantageous embodiment of the composite part is subject-matter of claim 13.

The invention provides a method for manufacturing a composite part for covering, sealing, trimming, or retaining a component of a vehicle. The composite part has a main body having a vehicle side surface. The main body includes a first polymer. The composite part features a mounting pin configured to engage in a form fitting manner. The mounting pin includes a second polymer. The second polymer has a higher formability, i.e. lower hardness, than the first polymer. The method comprises the steps of extrusion molding of the main body and injection molding of the mounting pin. The injection molding of the mounting pin is done in such a way, so as to integrally bond the mounting pin to the main body on the side of the vehicle side surface. Furthermore, the invention provides a composite part that is obtained by preferred embodiments of the manufacturing method.

A basic idea of the invention is to avoid separate fastening members, such as clips, thereby allowing for less effort in mounting the composite part. Thus the overall manufacturing of the vehicle can be aided. Furthermore, an integration of functionality can be achieved, that is the composite part can act as a cover, a seal, a trim, a retainer or any combination thereof. Another idea is using at least two different kinds of polymer for manufacturing the composite part. One is a polymer that is in itself robust, hard, or rather inelastic, for example a thermoplastic. The other polymer is deformable, soft, or elastic, for example a rubber or a thermoplastic elastomer. Surprisingly, the use of this combination of materials avoided deformation of the exposed surface of the main body, when the mounting pin is bonded to the main body by injection molding. It should be noted that no additional step for gluing is necessary.

According to the invention, the main body includes an end portion configured to engage the vehicle in a mounted state. The end portion is configured to be pressed towards the vehicle by a force resulting from bending elasticity of the main body in the mounted state. The main body includes a central portion and at least one wing portion, wherein the wing portion has the end portion. The mounting pin is disposed on the central portion and/or the wing portion. Alternatively or additionally, the mounting pin is disposed on the wing portion. In another embodiment the main body further comprises a first wing portion and a second wing portion. The central portion is preferably adjacent to the first wing portion and the second wing portion. In a preferred embodiment the central portion comprises a recessed portion configured to accommodate a trimming strip. Advantageously, the first wing portion is adjacent to the recessed portion. The central portion can comprise a flat portion. Preferably the second wing portion is adjacent to the flat portion. In accordance with a preferred embodiment the mounting pin is disposed between the first wing portion and the second wing portion, in particular between the recessed portion and the second wing portion. Advantageously, the mounting pin is disposed on the flat portion. Alternatively or additionally, the mounting pin is disposed on the second wing portion. With the main body being made of rather inelastic material, a desired deformability may be introduced by shaping the main body to allow for a bending elasticity. The positioning of the mounting pin in combination with the shape of the main body can enable adjustable bending elasticity.

In a preferred embodiment, the composite part further comprises a supporting portion. Preferably before injection molding the mounting pin, the supporting portion is injection molded, so as to integrally bond to the main body. Advantageously the step of injection molding the mounting pin comprises integrally bonding the mounting pin to the supporting portion. Optionally, the supporting portion and the main body are formed as a unitary member using the same polymer. In a preferential embodiment the composite part further comprises a supporting cavity defined by the supporting portion and the main body. Preferably, the supporting portion includes a first leg and a second leg. Optionally, the first leg is being integrally bonded to the central portion, in particular the flat portion. Alternatively or additionally the second leg is being integrally bonded to the wing portion. Advantageously, the first leg and the second leg are being formed as a unitary member using the same polymer. The supporting cavity can be preferably defined by any combination of the first leg, the second leg, and the main body, in particular the flat portion and/or the wing portion. With the supporting portion, the mounting distance can be adjusted, and the mounting pin can be formed in roughly the same size as with other embodiments. This allows for a more stable fastening than simply elongating the mounting pin itself. Furthermore, vibration damping to avoid undesired noise can be included.

According to another preferred embodiment, the composite part further comprises a wing sealing lip. Advantageously, the wing sealing lip is injection molded simultaneously with the mounting pin. Alternatively, the wing sealing lip is injection molded after the mounting pin was formed. Preferably the wing sealing lip is formed, so as to integrally bond the wing sealing lip to the main body, in particular to the end portion. Furthermore, the wing sealing lip can additionally be integrally bonded to the vehicle side surface and/or the mounting pin. Optionally, the wing sealing lip and the mounting pin are integrally formed as a unitary member using the same polymer. With this example sealing functionality can be introduced to the composite part. In addition with the bending elasticity of the main body, a rather reliable seal can be achieved.

Advantageously, the first polymer includes a thermoplastic. The first polymer can be chosen from a group containing, but not limited to, ABS, PS, PP, or PE. Alternatively or additionally the first polymer can include a polymer blend comprising a thermoplastic. The thermoplastic can be chosen from a group containing, but not limited to, ABS, PS, PP, or PE. Preferably, the first polymer has a Shore-D hardness between 40 and 100, more preferably between 65 and 85, most preferably between 70 and 80. Advantageously, the second polymer includes a thermoplastic elastomer. Alternatively or additionally the second polymer includes a thermoplastic vulcanisate. The second polymer can include, among others, EPDM and rubber. Furthermore, the second polymer can include a polymer blend. Preferably, the second polymer has a Shore-A hardness between 40 and 100, more preferably between 45 and 80, most preferably between 50 and 75. The combinations of materials surprisingly turned out to reduce undesired deformations of the exposed surface with higher likelihood.

In a preferred embodiment, the mounting pin extends in a mounting direction and further comprises a base portion and a head portion. Preferably, the base portion is integrally bonded to the main body on the side of the vehicle side surface, in particular to the vehicle side surface itself. The head portion can be configured to engage in a form fitting manner. The mounting pin, in particular the head portion, can include a mounting cavity. Furthermore, the mounting pin, in particular the base portion, can include a fastening disc. In another advantageous embodiment, the head portion includes an engaging surface extending substantially annularly and orthogonally with respect to the mounting direction. Preferably, the head portion further includes a guiding surface extending substantially with an angle with respect to the mounting direction. The head portion can further include a front surface extending substantially orthogonally to the mounting direction and being spaced apart from the engaging surface in the mounting direction. In another embodiment, the head portion can be substantially shaped as a truncated cone or a mushroom. In a further preferred embodiment, the composite part further comprises an annular sealing lip being integrally bonded to the mounting pin, in particular to the base portion. Preferably, the annular sealing lip is biased away from the vehicle side surface, in particular towards the head portion. The annular sealing lip can be integrally formed as a unitary member with the mounting pin using the same polymer. With this mounting pin fastening of the composite part is particularly easy. The guiding surface allows for a simple fastening. Additionally, using a cavity the formability of the mounting pin can be adapted to the application. A sealing lip can further the sealing functionality.

In an advantageous embodiment the composite part includes a retaining portion disposed on the main body, in particular on the exposed side surface. The retaining portion is in particular configured for retaining a pinch sensor. The retaining portion can be formed as a separate retaining profile which is fastened to the main body. In a preferred alternative the retaining portion can be formed as a retaining section which is configured as a single unitary member with the main body. The retaining portion is preferably disposed on the wing portion. With these arrangements the composite part further integrates a safety feature. The pinch sensor can be mounted near the moving path of the edges of a closing element, so as to detect an object, such as a body part, within the path of movement. A suitable controller can process the output of the pinch sensor and possibly stop and/or reverse the movement of the closing element in order to avoid pinching of the object. It is also conceivable, that an illumination device is accommodated by the retaining portion.

It should be noted that certain embodiments do not necessarily achieve all advantages described above at the same time. Embodiments of the invention are described with reference to the schematic drawings. The figures are listed below.

SUMMARY OF THE INVENTION

Figure 1:
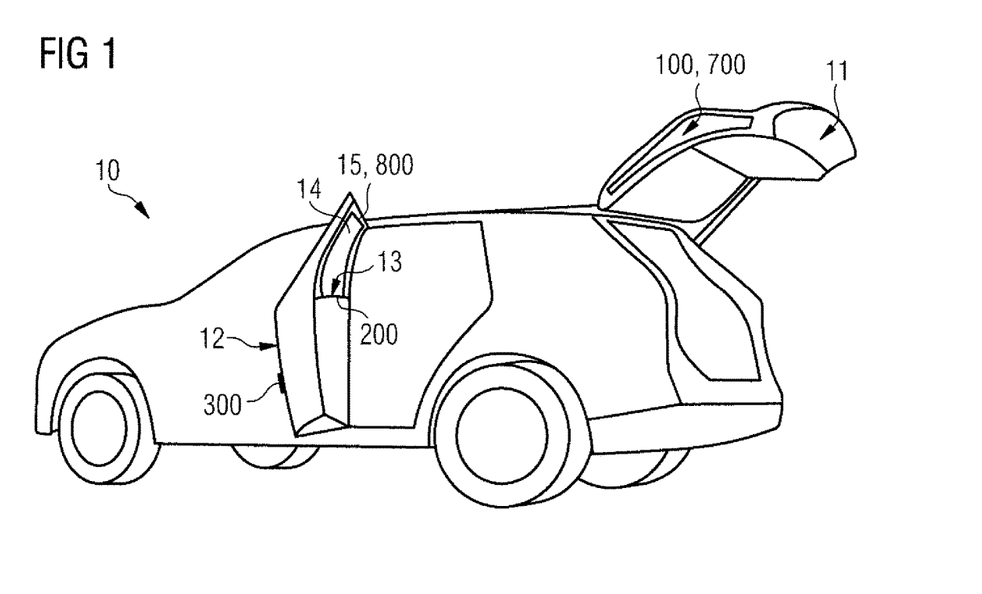
FIG. 1 depicts a vehicle including preferred composite parts.

FIG. 1 depicts a vehicle 10. The vehicle 10 comprises a trunk lid 11 which is an example of a component of the vehicle 10. The trunk lid 11 is provided with a composite part 100 obtained by a method according to a first embodiment acting as a cover. The composite part 100 extends in a longitudinal direction and is disposed at the left or right side of the trunk lid 11, for example.

Figure 2:
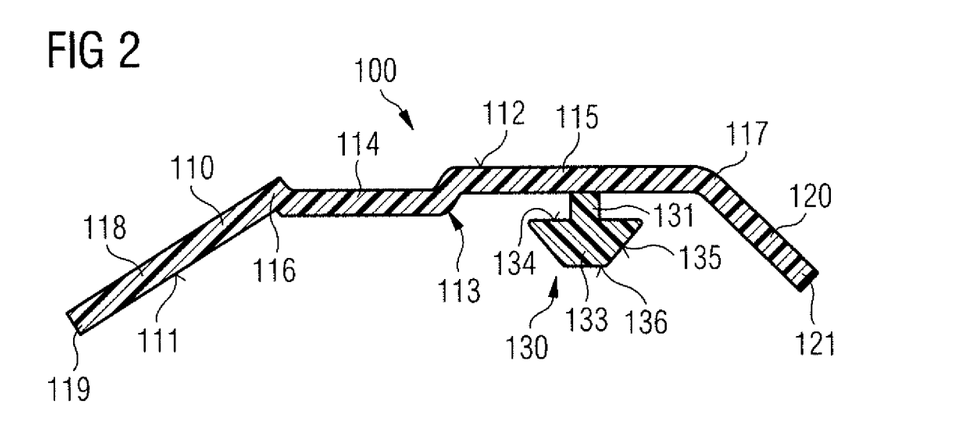
FIG. 2 depicts a cross section of a composite part obtained by a first embodiment of the manufacturing method.

As may be gathered from FIG. 2, the composite part 100 comprises a main body 110. The main body 110 is formed as a single member using a first polymer or polymer blend. The first polymer includes a thermoplastic, for instance ABS. The main body 110 in general exhibits a vehicle side surface 111 and an exposed surface 112. When the composite part 100 is mounted to the trunk lid 11, the vehicle side surface 111 is facing towards the trunk lid 11, whereas the exposed surface 112 is facing away from the trunk lid 11. It should be noted that the exposed surface 112 is not necessarily visible for a spectator.

The main body 110 further comprises a central portion 113 extending substantially flat. The central portion 113 can include a recessed portion 114 for accommodating a trimming strip and a flat portion 115 adjacent to the recessed portion 114. The recessed portion 114 can be configured accommodate the trimming strip, so as to allow for an overall flush surface.

The main body 110 has a first curved portion 116. The first curve portion 116 is adjacent to the central portion 113, more precisely the recessed portion 114. The first curved portion 116 bends towards the side of the vehicle side surface 111. The main body 110 further has a second curved portion 117. The second curved portion 117 is also adjacent to the central portion 113, more precisely the flat portion 115. The second curve portion 117 bends towards the side of the vehicle side surface 111. The first curved portion 116 and the second curved portion 117 can have the same bending radius, but do not need to be bent in a circular arcuate shape.

The main body 110 is provided with a first wing portion 118 which exhibits the first curved portion 116 and a first end portion 119. The first wing portion 118 is adjacent to the recessed portion 114. The main body 110 is further provided with a second wing portion 118 which exhibits the second curved portion 117 and a second end portion 119. The second wing portion 119 is adjacent to the flat portion 115. Thus, the main body 110 can encompass a certain bending elasticity.

The composite part 100 further includes a mounting pin 130 for mounting the composite part 100 to the vehicle 10, in particular the trunk lid 11. The mounting pin 130 is formed as a single member using a second polymer or polymer blend. The second polymer includes a thermoplastic elastomer, for example EPDM. In this embodiment the mounting pin 130 is disposed on the flat portion 115. The mounting pin 130 extends in a mounting direction, which is substantially perpendicular to the flat portion 115. The mounting pin 130 has in general a cylindrical shape and is not necessarily circular.

The mounting pin 130 comprises a base portion 131. The base portion 131 is bonded to the flat portion 115. The base portion 131 can be elastically deformed, in particular along the mounting direction.

The mounting pin 130 further comprises a head portion 133. The head portion 133 is configured to engage in a form fitting manner. The head portion 133 exhibits an engaging surface 134 extending substantially orthogonal to the mounting direction and substantially annularly in a circumferential direction of the mounting pin 130. The engaging surface 134 is configured to engage, that is, when in a mounted state, come in to contact with, a surface portion of the trunk lid 11, so as to prevent a movement of the composite part 100 parallel to the mounting direction.

Furthermore, the head portion 133 can include a guiding surface 135. The guiding surface 135 forms an oblique angle with the mounting direction, thereby substantially generating the shape of a frustrated cone. The guiding surface 135 allows for an initial engagement of the mounting pin 130 and subsequently a reliable fastening by pushing.

Additionally, the head portion 133 may comprise a front surface 136. The front surface 136 is substantially orthogonal with respect to the mounting direction and spaced apart from the engaging surface 134 along the mounting direction.

When mounted to the trunk lid 11, the mounting pin 130 engages with a portion of the trunk lid 11. The main body 110 and the mounting pin 130 are configured to cooperate, so as to cause a force urging the composite part 100 towards the trunk lid 11. Due to the mounting pin 130 being elastically deformable, in particular along the mounting direction, the force is generated and the main body 110 is pulled towards the trunk lid 11. Thereby the first end portion 119 and the second end portion 121 are pressed towards the trunk lid 11 and are in contact with the trunk lid 11.

The composite part 100 is manufactured by molding of at least two different polymers. The main body 110 is formed by extrusion molding. Consequently, the main body 110 extends in a longitudinal direction and can be cut to pieces of desired length. The extrusion molding is done using a first polymer having high Shore-D-hardness. The first polymer can be a polymer blend and includes a thermoplastic, for example ABS.

Subsequently, a plurality of mounting pins 130 are bonded to the main body 110 by injection molding at predetermined intervals. The injection molding is done using a second polymer being more deformable than the first polymer. The second polymer can be a polymer blend and includes a thermoplastic elastomer, for example EPDM.

During the injection molding small portions of the main body 110 are reheated. This usually causes indentations on the exposed surface 112, which is undesirable. Using a softer, easier deformable material for the injection molding, allows for a reduction of the depth indentations and in turn a smoother exposed surface 112. Also the manufacturing method is highly adaptable for different kinds composite parts, such as sealing strips for window shafts, windows (both movable and static), and the like.

For the sake of brevity further embodiments are merely described in so far, as they differ from previously discussed embodiments.

Referring again to FIG. 1, the vehicle 10 further comprises a vehicle door 12 which is another example of a component of the vehicle 10. The vehicle door 12 has a window shaft 13 provided with a composite part 200 obtained by a method according to a second embodiment. The composite part 200 extends in a longitudinal direction substantially in parallel to the window shaft 13 and is disposed on the inside of the vehicle 10.

Figure 3:
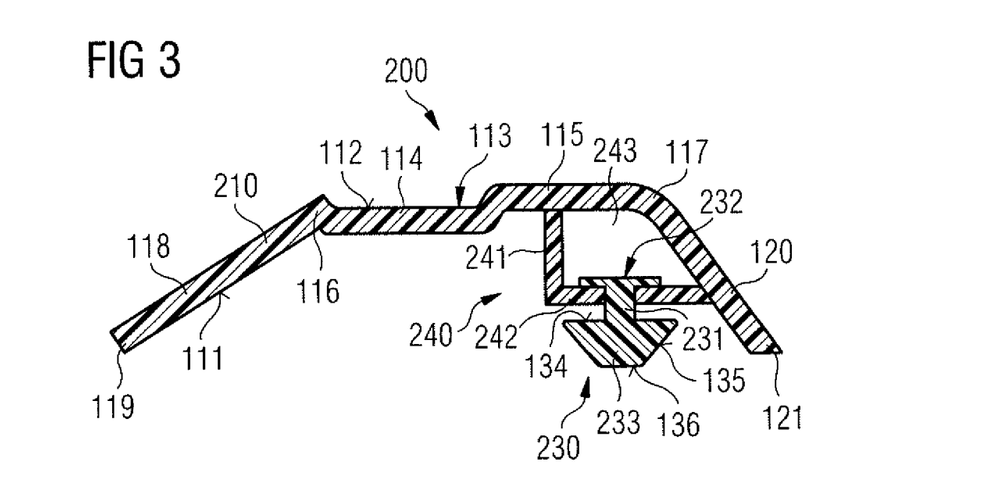
FIG. 3 depicts a cross section of a composite part obtained by a second embodiment of the manufacturing method.

As may be gathered from FIG. 3, the composite part 200 comprises a main body 210 which substantially has the same design as the main body 110. The composite part 200 further includes a mounting pin 230 for mounting the composite part 200 to the vehicle 10. The mounting pin 230 is formed as a single member using a second polymer or polymer blend. The second polymer includes a thermoplastic vulcanisate. The mounting pin 230 extends in a mounting direction.

The mounting pin 230 comprises a base portion 231. The base portion 231 is bonded to the flat portion 115. The base portion 231 can be elastically deformed, in particular along the mounting direction. The base portion 231 further includes a fastening disk 232 for fastening the mounting pin 230. The fastening disk 232 extends substantially orthogonal with respect to the mounting direction. The mounting pin 230 further comprises a head portion 233 which is configured in substantially the same manner as the head portion 133.

According to FIG. 3, the composite part 200 further comprises a supporting portion 240. The supporting portion 240 is bonded to the main body 210. The supporting portion 240 supports the mounting pin 230. The supporting portion 240 comprises a first leg 241 and a second leg 242, which are integrally bonded to each other. The first leg 241 and the second leg 242 can be arranged orthogonally. The first leg 241 is integrally bonded to the main body 210, in particular to the central portion 113 or the flat portion 115. The second leg 242 is integrally bonded to the first wing portion 118 or the second wing portion 120. The mounting pin 230 is fastened to the second leg 242, for example via the fastening disk 232.

The composite part 200 further includes a supporting cavity 243. The supporting cavity 243 allows for a vibrational damping of relative movements between the main body 210 and the mounting pin 230. The supporting cavity 243 is presently defined by the main body 210 and supporting portion 240. This can be particularly advantageous when the composite part 200, as in the present embodiment, is provided on the inside of the vehicle in the passenger area.

When mounted to the vehicle door 12 the composite part 200 hast similar effects as the composite part 100. The composite part 200 is manufactured by molding of at least two different polymers as described before. Additionally, the supporting portion 240 is injection molded to the main body 210. The supporting portion 240 is preferably only formed at positions, where a mounting pin 230 is to be provided.

The mounting pin 230 and the supporting portion 240 can be injection molded simultaneously or subsequently. During the injection molding small portions of the main body 210 are reheated. Using a supporting portion 240 between the main body 210 and the mounting pin 230, in particular when the supporting portion 240 is formed using the same material as for the main body 210, allows for a smoother exposed surface 112.

Referring back to FIG. 1 the vehicle door 12 is provided with a composite part 300 obtained by a method according to a third embodiment for trimming and sealing on the outside of the vehicle 10. As may be gathered from FIG. 4, the composite part 300 comprises a main body 310. The main body 310 is similar to the main body 110. However the main body 310 is formed as a single member using a polymer blend. The polymer blend includes a mixture of thermoplastics, for instance PE and PP.

Figure 4:
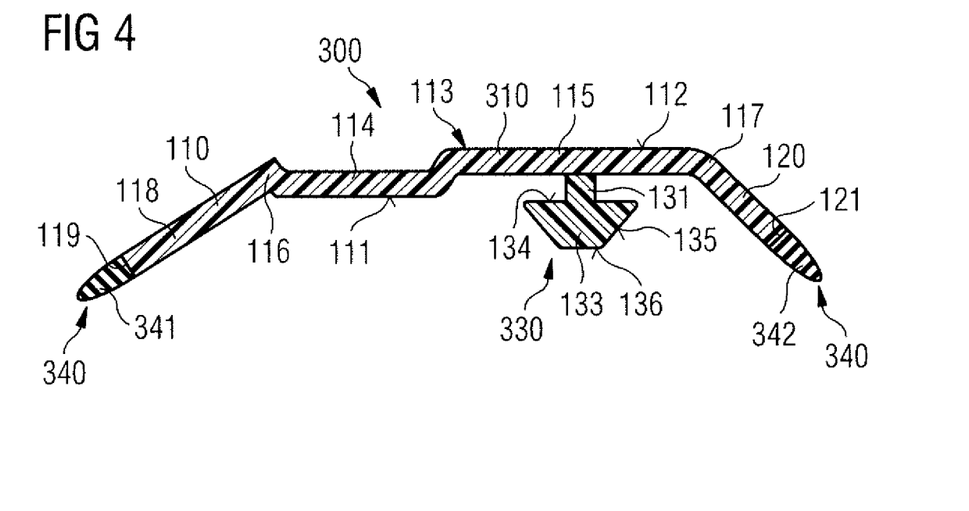
FIG. 4 depicts a cross section of a composite part obtained by a third embodiment of the manufacturing method.
Figure 5:
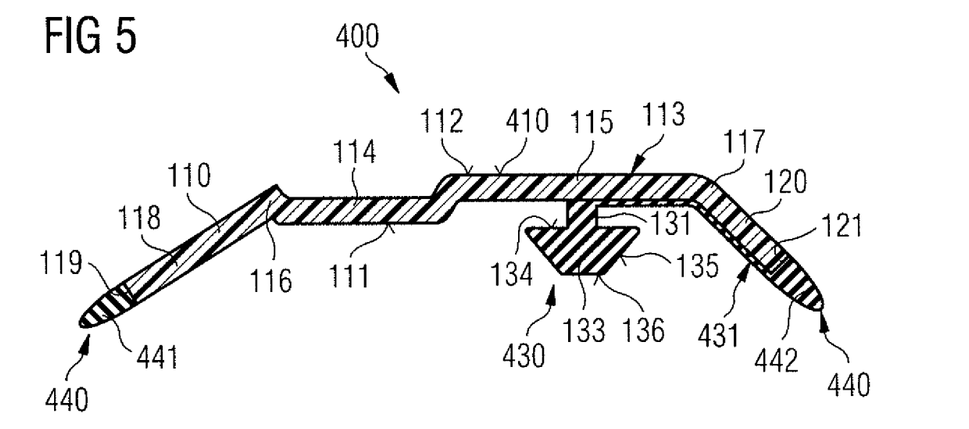
FIG. 5 depicts a cross section of a composite part obtained by a fourth embodiment of the manufacturing method.

The composite part 300 further includes a mounting pin 330 for mounting the composite part 300 to the vehicle 10, in particular the vehicle door 12. The mounting pin 330 is similar to the mounting pin 130.

The composite part 300 comprises a sealing portion 340 for sealing, for example against humidity. The sealing portion 340 comprises a first wing sealing lip 341 and a second wing sealing lip 342. The first wing sealing lip 341 is integrally bonded to the first end portion 119. The second wing sealing lip 342 is integrally bonded to the second end portion 121. The sealing portion 340, more precisely the first wing sealing lip 341 and the second wing sealing lip 342 are formed by injection molding using a polymer or polymer blend, in particular a thermoplastic elastomer preferably including natural rubber or EPDM.

Similar to the first embodiment, when the composite part 300 is mounted to the vehicle door 12, the main body 310 is elastically deformed, thereby pressing the first end portion 119 and the second end portion 121 towards the surface of the vehicle door 12. In turn, the first wing lip 341 and the second wing lip 342 are in contact with the vehicle door 12 and allow for forming a seal, for instance against humidity.

The composite part 300 is manufactured similar to the composite part 100 by molding of at least two different polymers. The main body 310 is formed by extrusion molding as described before. Subsequently, a plurality of mounting pins 330 are bonded to the main body 310 by injection molding at predetermined intervals as described before. Simultaneously or subsequently the sealing portion 340, that is the first wing lip 341 and the second wing lip 342, is injection molded, so as to integrally bond to the first end portion 119 and the second end portion 121, respectively. In the present embodiment the composite part 300 is formed using a total of three different polymers.

Referring now to FIG. 4, a composite part 400 obtained by a method according to a fourth embodiment comprises a main body 410. The main body 410 is similar to the main body 310. The composite part 400 further includes a mounting pin 430 for mounting the composite part 400 to the vehicle 10. The composite part 400 also comprises a sealing portion 440 for sealing, for example against humidity. The sealing portion 440 comprises a first wing sealing lip 441 which is similar to the first wing sealing lip 341. The sealing portion 440 has a second wing sealing lip 442. The mounting pin 430 and the second wing sealing lip 442 are integrally formed as a single unitary member. The composite part 400 therefore exhibits a connecting portion 431 extending between the mounting pin 430 and the second wing sealing lip 442. The connecting portion 431 is integrally bonded to the main body 410. The mounting pin 430 and the second wing sealing lip 442, consequently also the connecting portion 431, are formed by injection molding using a polymer or polymer blend, in particular a thermoplastic elastomer preferably including natural rubber or EPDM.

The composite part 400 is manufactured similar to the composite part 300 by molding of at least two different polymers. The main body 410 is formed by extrusion molding as described before. Subsequently, a plurality of mounting pins 430 and the second sealing lip 442 are bonded to the main body 410 by injection molding. The mounting pins 430 are provided at predetermined intervals as described before. The mounting pin 430 and the second wing lip 442 are simultaneously formed by injection molding, so as to integrally bond to the main body 410. In the present embodiment the composite part 400 is formed using a total of two different polymers.

Figure 6:
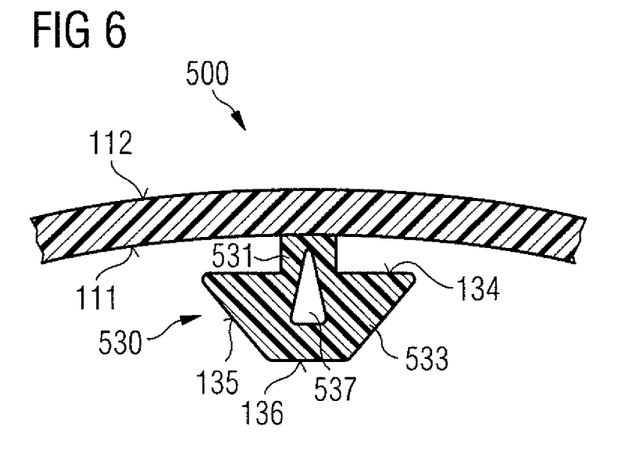
FIG. 6 partially depicts an example of a mounting pin obtained by a fifth embodiment of the manufacturing method.

Referring to FIG. 6, a composite part 500 obtained by a method according to a fifth embodiment can be any one of the previously described embodiments. The composite part 500 comprises a mounting pin 530. The mounting pin 530 extends in a mounting direction and comprises a base portion 531. The base portion 531 can be elastically deformed, in particular along the mounting direction. The mounting pin 530 further comprises a head portion 533. The head portion 533 is configured similar to the head portion 133. Additionally, the head portion 533 has a cavity 537. The cavity 537 can facilitate the overall deformation of the mounting pin 530.

Figure 7:
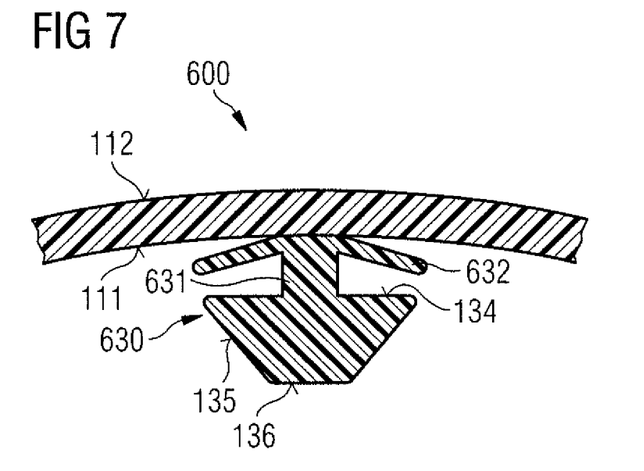
FIG. 7 partially depicts an example of a mounting pin obtained by a sixth embodiment of the manufacturing method.

Referring to FIG. 7, a composite part 600 obtained by a method according to a sixth embodiment can be any one of the previously described embodiments. The composite part 600 comprises a mounting pin 630. The mounting pin 630 is similar to the mounting pins according to the previously described embodiments. The mounting pin 630 includes a base portion 631. Additionally, the mounting pin 630 has an annular sealing disk 632, so as to seal an opening of the vehicle 10, in which the mounting pin 630 is inserted. The annular sealing disk 632 is disposed on the base portion 631.

Referring again to FIG. 1, the vehicle 10 further comprises a pinch sensor 15 which is another example of a component of the vehicle 10. The pinch sensor 15 is disposed at the trunk lid 11, so as to detect an object in the movement path of the trunk lid 11. The pinch sensor 15 is retained by a composite part 700 obtained by a method according to a seventh embodiment.

Figure 8:
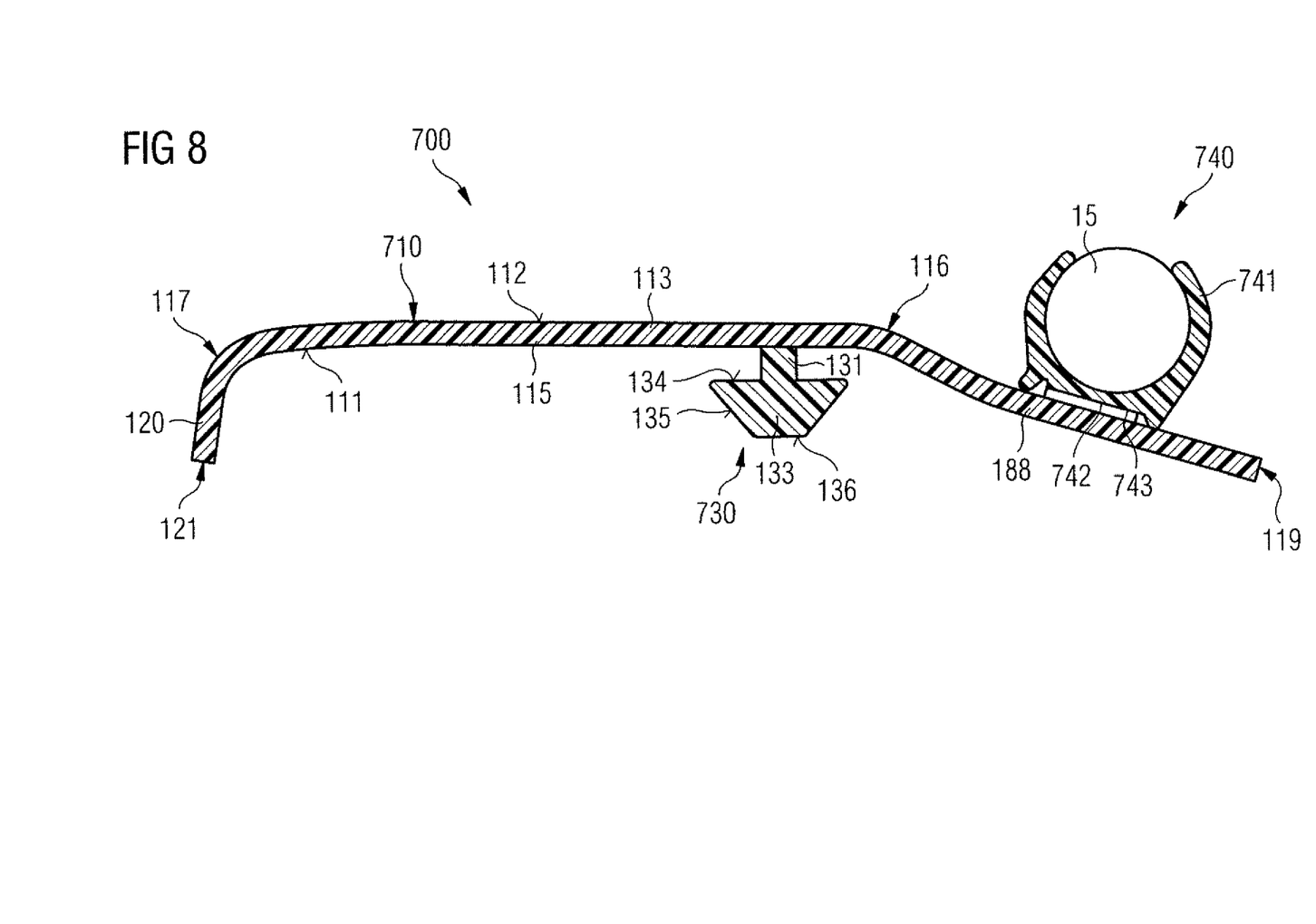
FIG. 8 depicts a cross section of a composite part obtained by a seventh embodiment of the manufacturing method.

As may be gathered from FIG. 8, the composite part 700 comprises a main body 710 which is configured similar to the main body 110. Different from the main body 110, however, the main body 710 does not include a recessed portion. The main body 710 is formed as a single member using a first polymer or polymer blend. The first polymer includes a thermoplastic, for instance ABS.

The composite part 700 further includes a mounting pin 730 for mounting the composite part 700 to the trunk lid 11. The mounting pin 730 is configured similar to the mounting pin 130, for example. Furthermore, the composite part 700 includes a retaining portion 740 for accommodating the pinch sensor 15. The retaining portion 740 comprises a retaining profile 741. The retaining profile 741 extends in a longitudinal direction and is manufactured separately from the main body 710. The retaining profile 741 is fastened to the exposed surface 112 by a suitable fastening member 742, preferably an adhesive strip 743.

Referring again to FIG. 1, the vehicle 10 further comprises a window pane 14 which is another example of a component of the vehicle 10. The window pane 14 is provided in the window shaft 13, so as to be movable between an open position and a closed position. The window pane 14 is also an example for a closing element. On the upper inside of the vehicle door 12, a composite part 800 obtained by a method according to an eighth embodiment is disposed. The composite part 800 can serve as a cover and/or sealing for the frame of the vehicle door 12.

Figure 9:
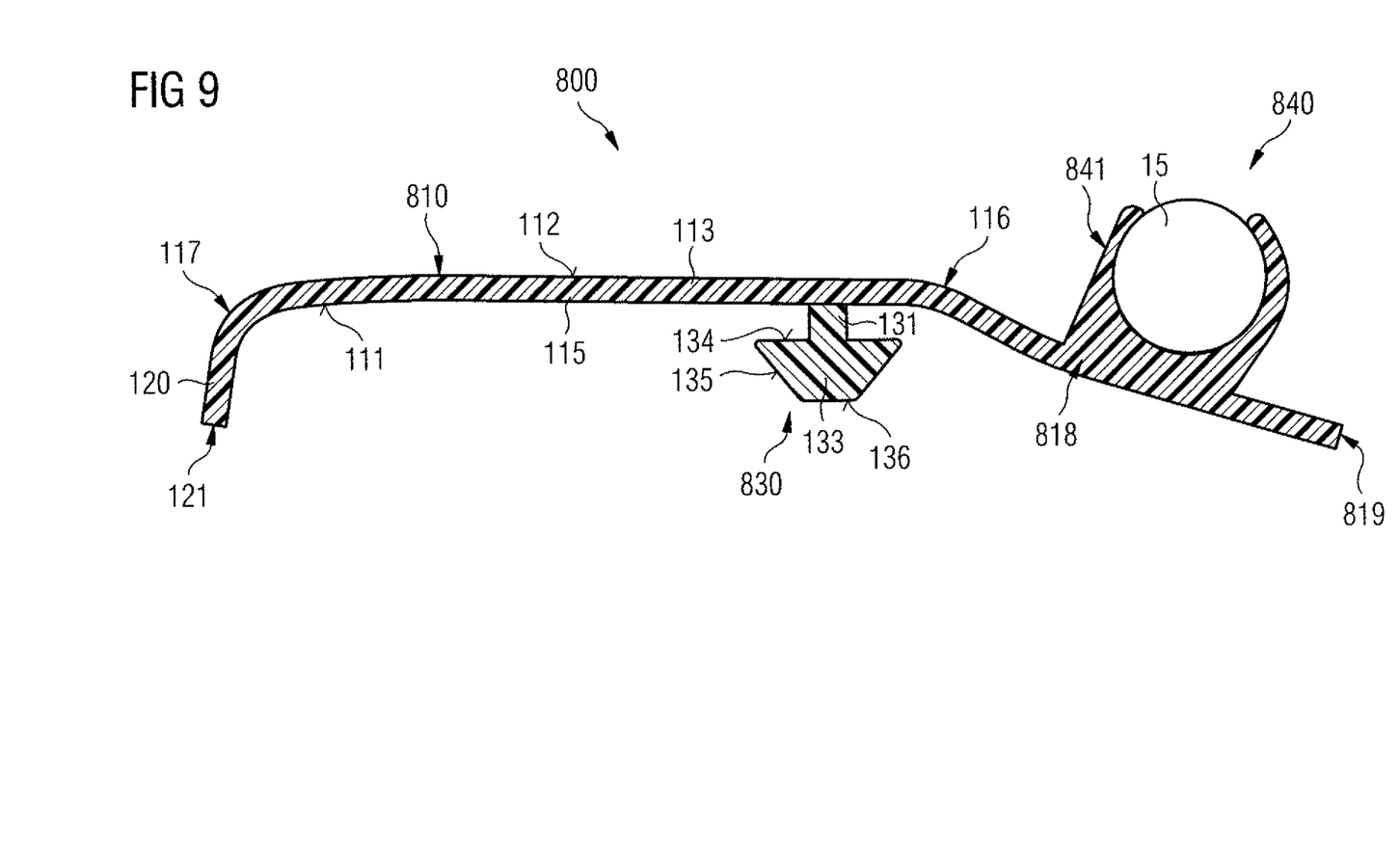
FIG. 9 depicts a cross section of a composite part obtained by an eighth embodiment of the manufacturing method.

As may be gathered from FIG. 9, the composite part 800 comprises a main body 810 which is configured similar to the main body 710. The main body 710 is formed as a single member using a first polymer or polymer blend. The first polymer includes a thermoplastic, for instance ABS.

The composite part 800 further includes a mounting pin 830 for mounting the composite part 800 to the vehicle door 12. The mounting pin 830 is configured similar to the mounting pin 710, for example. Additionally, the composite part 800 includes a retaining portion 840 for accommodating the pinch sensor 15. The retaining portion 840 comprises a retaining section 841. The retaining section 841 is integrally formed with the main body 810 as a single unitary member.

The composite parts 100, 200, 300, 400, 500, 600, 700, 800 described herein are composed of at least to polymer materials. The combination of hard polymer materials for the main body 110, 210, 310, 410, 510, 610, 710, 810 with the soft materials of the mounting pin 130, 230, 330, 430, 530, 630, 730, 830 allows in particular for a smoother surface. The composite parts 100, 200, 300, 400, 500, 600, 700, 800 are formed by extrusion molding and subsequent injection molding.

LIST OF REFERENCE SIGNS

| | |
|---|---|
| 10 | vehicle |
| 11 | trunk lid |
| 12 | vehicle door |
| 13 | window shaft |
| 14 | window pane |
| 15 | pinch sensor |
| 100 | composite part |
| 110 | main body |
| 111 | vehicle side surface |
| 112 | exposed surface |
| 113 | central portion |
| 114 | recessed portion |
| 115 | flat portion |
| 116 | first curved portion |
| 117 | second curved portion |
| 118 | first wing portion |
| 119 | first end portion |
| 120 | second wing portion |
| 121 | second end portion |
| 130 | mounting pin |
| 131 | base portion |
| 133 | head portion |
| 134 | engaging surface |
| 135 | guiding surface |
| 136 | front surface |
| 200 | composite part |
| 210 | main body |
| 230 | mounting pin |
| 231 | base portion |
| 232 | fastening disk |
| 233 | head portion |
| 240 | supporting portion |
| 241 | first leg |
| 242 | second leg |
| 243 | supporting cavity |
| 300 | composite part |
| 310 | main body |
| 330 | mounting pin |
| 340 | sealing portion |
| 341 | first wing lip |
| 342 | second wing lip |
| 400 | composite part |
| 410 | main body |
| 430 | mounting pin |
| 431 | connecting portion |
| 440 | sealing portion |
| 441 | first wing lip |
| 442 | second wing lip |
| 500 | composite part |
| 530 | mounting pin |
| 531 | base portion |
| 533 | head portion |
| 537 | cavity |
| 600 | composite part |
| 630 | mounting pin |

-continued

| 631 | base portion |
| --- | --- |
| 632 | annular sealing disk |
| 700 | composite part |
| 710 | main body |
| 730 | mounting pin |
| 740 | retaining portion |
| 741 | retaining profile |
| 742 | fastening member |
| 743 | adhesive strip |
| 800 | composite part |
| 810 | main body |
| 818 | first wing portion |
| 819 | first end portion |
| 830 | mounting pin |
| 840 | retaining portion |
| 841 | retaining section |

The invention claimed is:

1. A method for manufacturing a composite part for covering, sealing, trimming, or retaining a component of a vehicle, the composite part comprising:
- a main body having a shape and comprising a central portion and at least one wing portion having an end portion, the central portion and the at least one wing portion defining a vehicle side surface, the end portion being configured to abut against the component of the vehicle in a mounted state;
- a mounting pin disposed on the central portion or the at least one wing portion and being configured to engage the component of the vehicle in a form fitting manner, thereby pressing the end portion towards the component of the vehicle in the mounted state by a force resulting from bending elasticity of the main body; and
- a wing sealing lip;

wherein the method comprises the steps of:
- 1.1 extrusion molding of the main body from a first polymer so as to form the central portion and the at least one wing portion;
- 1.2 injection molding of the mounting pin from a second polymer having a higher formability than the first polymer so as to integrally bond the mounting pin to the main body on the vehicle side surface; and
- 1.3 injection molding of the wing sealing lip simultaneously with or after step 1.2, so as to integrally bond the wing sealing lip to the end portion.

2. The method of claim 1, wherein the main body comprises a first wing portion and a second wing portion;
wherein the central portion is adjacent to the first wing portion and the second wing portion.

3. The method of claim 1, wherein the composite part further comprises a supporting portion;
wherein, before step 1.2, the supporting portion is injection molded, so as to integrally bond to the main body;
wherein step 1.2 comprises integrally bonding the mounting pin to the supporting portion; and
wherein the supporting portion and the main body are formed as a unitary member using the same polymer.

4. The method of claim 3, wherein the composite part further comprises a supporting cavity defined by the supporting portion and the main body;
wherein the supporting portion includes a first leg and a second leg; and
wherein the supporting cavity is defined by the first leg, the second leg, and the main body.

5. The method of claim 1, wherein the wing sealing lip is additionally integrally bonded to the vehicle side surface or the mounting pin.

6. The method of claim 1, wherein the first polymer has any one of the following features:
- 7.1 the first polymer includes a thermoplastic which is selected from the group consisting of Acrylnitril-Butadien-Styrol-Copolymere (ABS), Polystyrol (PS), Polypropylen (PP), and Polyethylen (PE);
- 7.2 the first polymer includes a polymer blend comprising a thermoplastic which is selected from the group consisting of Acrylnitril-Butadien-Styrol-Copolymere (ABS), Polystyrol (PS), Polypropylen (PP), and Polyethylen (PE); and
- 7.3 the first polymer has a Shore-D hardness between 40 and 100.

7. The method of claim 1, wherein the second polymer has any one of the following features:
- 8.1 the second polymer includes a thermoplastic elastomer or a thermoplastic vulcanisate;
- 8.2 the second polymer includes a polymer blend; and
- 8.3 the second polymer has a Shore-A hardness between 40 and 100.

8. The method of claim 1, wherein the mounting pin extends in a mounting direction and further comprises a base portion and a head portion, the base portion being integrally bonded to the main body on the vehicle side surface;
wherein the head portion is configured to engage in a form fitting manner;
wherein the head portion; includes a mounting cavity; and
wherein the base portion includes a fastening disc.

9. The method of claim 8, wherein the head portion includes an engaging surface extending substantially annularly and orthogonally with respect to the mounting direction;
wherein the head portion further includes a guiding surface extending substantially with an angle with respect to the mounting direction; and
wherein the head portion further includes a front surface extending substantially orthogonally to the mounting direction and being spaced apart from the engaging surface in the mounting direction.

10. The method of claim 1, wherein the composite part further comprises an annular sealing lip being integrally bonded to the mounting pin;
wherein the annular sealing lip is biased away from the vehicle side surface towards the head portion.

11. The method of claim 1, wherein the composite part further comprises:
- an extrusion molded main body the first polymer; and
- an injection molded mounting pin, the mounting pin being integrally bonded to the main body on the vehicle side surface by injection molding using the second polymer.

12. The method of claim 11, wherein the first polymer has any one of the following features:
- 13.1 the first polymer includes a thermoplastic which is selected from the group consisting of Acrylnitril-Butadien-Styrol-Copolymere (ABS), Polystyrol (PS), Polypropylen (PP), and Polyethylen (PE);
- 13.2 the first polymer includes a polymer blend comprising a thermoplastic which is selected from the group consisting of Acrylnitril-Butadien-Styrol-Copolymere (ABS), Polystyrol (PS), Polypropylen (PP), and Polyethylen (PE); and
- 13.3 the first polymer has a Shore-D hardness between 40 and 100, wherein the second polymer has any one of the following features:
- 13.4 the second polymer includes a thermoplastic elastomer or a thermoplastic vulcanisate;

13.5 the second polymer includes a polymer blend; and
13.6 the second polymer has a Shore-A hardness between 40 and 100.

13. The method of claim 2, wherein the central portion comprises a recessed portion configured to accommodate a trimming strip;
  wherein the first wing portion is adjacent to the recessed portion.

14. The method of claim 2, wherein the central portion comprises a flat portion;
  wherein the second wing portion is adjacent to the flat portion.

15. The method of claim 2, wherein the mounting pin is disposed between the first wing portion and the second wing portion.

16. The method of claim 14, wherein the mounting pin is disposed on the flat portion or on the second wing portion.

17. The method of claim 4, wherein the first leg is being integrally bonded to the central portion;
  wherein the second leg is being integrally bonded to the wing portion; and
  wherein the first leg and the second leg are being formed as a unitary member using the same polymer.

18. The method of claim 9, wherein the head portion is substantially shaped as a truncated cone or a mushroom.

19. The method of claim 10, wherein the annular sealing lip is integrally formed as a unitary member with the mounting pin using the same polymer.

* * * * *